(12) United States Patent
Stolt

(10) Patent No.: US 9,731,935 B2
(45) Date of Patent: Aug. 15, 2017

(54) METHOD AND APPARATUS FOR CONTROLLING AN ELECTRIC MOTOR OF AN ELEVATOR WITHOUT AN ENCODER

(71) Applicant: Lauri Stolt, Helsinki (FI)

(72) Inventor: Lauri Stolt, Helsinki (FI)

(73) Assignee: Kone Corporation, Helsinki (FI)

( * ) Notice: Subject to any disclaimer, the term of this patent is extended or adjusted under 35 U.S.C. 154(b) by 513 days.

(21) Appl. No.: 14/296,623

(22) Filed: Jun. 5, 2014

(65) Prior Publication Data

US 2014/0374194 A1    Dec. 25, 2014

(30) Foreign Application Priority Data

Jun. 20, 2013    (FI) ...................................... 20135682

(51) Int. Cl.
*B66B 1/30* (2006.01)
*H02P 6/18* (2016.01)
*H02P 6/185* (2016.01)
*H02P 21/24* (2016.01)

(52) U.S. Cl.
CPC .............. *B66B 1/304* (2013.01); *H02P 6/183* (2013.01); *H02P 6/185* (2013.01); *H02P 21/24* (2016.02)

(58) Field of Classification Search
CPC .......... B66B 1/304; H02P 21/24; H02P 6/183; H02P 6/185
USPC ....... 187/247, 277, 289, 293, 296, 297, 391, 187/393, 288; 318/799–815
IPC .................................. H02P 21/24,6/183, 6/185
See application file for complete search history.

(56) References Cited

U.S. PATENT DOCUMENTS

| 4,042,068 A | | 8/1977 | Ostrander et al. | |
|---|---|---|---|---|
| 5,131,507 A | * | 7/1992 | Watanabe | B66B 1/30 187/285 |
| 5,325,036 A | * | 6/1994 | Diethert | B66B 1/06 187/289 |
| 5,476,158 A | * | 12/1995 | Mann | B66B 1/28 187/289 |
| 5,608,300 A | * | 3/1997 | Kawabata | B60L 11/1807 318/400.16 |
| 5,909,018 A | * | 6/1999 | Vecchiotti | B66B 1/30 187/296 |
| 5,929,400 A | | 7/1999 | Colby et al. | |
| 6,401,875 B1 | * | 6/2002 | Marvin | H02P 6/185 187/393 |
| 6,452,357 B1 | * | 9/2002 | Jahkonen | H02P 21/06 318/432 |
| 6,492,788 B1 | | 12/2002 | Agirman et al. | |

(Continued)

FOREIGN PATENT DOCUMENTS

DE    112010005230 T5    11/2012
JP      2001190099 A     7/2001

OTHER PUBLICATIONS

Finnish Search Report dated Jan. 17, 2014.
Extended European Search Report dated May 13, 2015 for Application No. EP 14172932.7.

*Primary Examiner* — Anthony Salata
(74) *Attorney, Agent, or Firm* — Harness, Dickey & Pierce P.L.C.

(57) ABSTRACT

In one or more example embodiments, an apparatus to control an elevator may include a motor having a rotor configured to rotate with a magnetic axis to drive the elevator at a speed based on a current applied thereto; and a processor configured to regulate the speed of the elevator without information on a speed or an angle of the rotor from an encoder or motion sensor.

15 Claims, 2 Drawing Sheets

(56) References Cited

U.S. PATENT DOCUMENTS

| | | | |
|---|---|---|---|
| 7,268,514 B2* | 9/2007 | DeLange | B66B 5/0031 187/291 |
| 7,658,268 B2* | 2/2010 | Kinpara | B66B 1/308 187/293 |
| 7,921,969 B2* | 4/2011 | Stolt | B66B 1/30 187/293 |
| 8,362,738 B2* | 1/2013 | Kauppinen | H02P 6/18 318/372 |
| 8,723,461 B2* | 5/2014 | Yoo | H02P 21/06 318/400.02 |
| 8,727,075 B2* | 5/2014 | Huppunen | B60T 8/885 187/288 |
| 2006/0061319 A1 | 3/2006 | Markunas et al. | |
| 2009/0021194 A1 | 1/2009 | Tonami et al. | |
| 2009/0039810 A1 | 2/2009 | Gotz et al. | |
| 2010/0187046 A1 | 7/2010 | Stolt et al. | |
| 2012/0229119 A1 | 9/2012 | Leidhold | |

\* cited by examiner

METHOD AND APPARATUS FOR CONTROLLING AN ELECTRIC MOTOR OF AN ELEVATOR WITHOUT AN ENCODER

This application claims priority to Finnish Patent Application No. 20135682 filed on Jun. 20, 2013, the entire contents of which are incorporated herein by reference.

FIELD OF THE INVENTION

The invention relates to methods and devices for controlling an electric motor of an elevator.

BACKGROUND OF THE INVENTION

An elevator car is driven in an elevator hoistway with an electric motor in response to the elevator calls given. The speed of an elevator car starting to move is accelerated evenly to maximum speed, and the speed is decelerated again evenly to zero when the elevator car arrives at a stopping floor.

The speed of an elevator car is usually measured with an encoder from the end of the shaft of the rotor of the electric motor, and the measured speed is adjusted to be that desired by adjusting the current of the electric motor with a frequency converter.

If the encoder fails or if operation of the encoder is interrupted, e.g. during an electricity outage, the operation of the elevator is also interrupted. Use of an elevator during installation also requires installation of an encoder or corresponding motion sensor on the electric motor.

AIM OF THE INVENTION

The aim of the invention is to disclose a solution for driving an elevator without an encoder or corresponding motion sensor. To achieve this aim the invention discloses a method for controlling an electric motor of an elevator and also a control apparatus of an elevator. The embodiments of the invention are described in the claims. Some inventive embodiments and also inventive combinations of the various embodiments are also presented in the descriptive section and in the drawings of the present application.

SUMMARY OF THE INVENTION

In the method according to the invention for controlling an electric motor of an elevator initial angle of the rotor of the electric motor is determined with the signal injection method, when a brake device is engaged to brake the rotor of the electric motor; an orthogonal dq coordinate system is presented by means of the specified initial angle in such a way that the d axis is in the direction of the magnetic axis of the rotor; the drive direction of the elevator car is selected and also the load of the elevator is determined before the start of a run; a reference value of the current in the direction of the q axis is formed on the basis of the drive direction of the elevator and proportional to the load of the elevator; also formed is the reference value of the current in the direction of the d axis to resist a change in the load angle caused by a sudden increase in the imbalance of the elevator; and also the brake device braking the rotor of the electric motor is opened and the elevator car is driven by controlling the current to the electric motor according to the reference value. Consequently, when the brake device opens a run of the elevator can be started evenly and without runaway speed, even though the control of the elevator does not have information on the movement or angle of the rotor of the electric motor available from an encoder or corresponding.

In a preferred embodiment of the invention, imbalance of the elevator means the resultant of the forces acting in opposing directions in the traction ropes on the different sides of the traction sheave, which force difference tries to turn the traction sheave.

In a preferred embodiment of the invention the reference value of the current in the direction of the d axis comprises a fraction of the reference value of the current in the direction of the q axis. In this case the stabilizing effect that the current in the direction of the d axis has on the movement of the rotor increases as the current in the direction of the q axis, and thus the load to be lifted, increases, which effectively stabilizes the movement of the load to be lifted.

In a preferred embodiment of the invention the electric motor is a permanent-magnet synchronous motor.

In one preferred embodiment of the invention the reference value of the current in the direction of the d axis also includes a separate constant term. The constant term stabilizes the rotation of the rotor particularly with small values of current in the direction of the q axis.

In one preferred embodiment of the invention a speed reference is formed, in response to which the elevator car is driven in the elevator hoistway; the frequency of the reference value of the current is formed by means of the speed reference; and also the elevator car is driven by controlling the current to the electric motor according to the reference value. This means that the elevator car can be driven evenly and reliably at a frequency according to the reference value, and thereby according to the speed reference, even though the control of the elevator does not have information on the movement or angle of the rotor of the electric motor available from an encoder or corresponding.

In one preferred embodiment of the invention a description for the speed of rotation of the rotor of the electric motor is formed, said description being based on the supply voltage, current and inductance of the electric motor; the speed of rotation of the rotor is measured by means of the description formed; and also a regulating loop is started for adjusting the measured speed of rotation of the rotor towards the speed reference when the measured speed of rotation of the rotor exceeds a set threshold value.

In one preferred embodiment of the invention the aforementioned regulating loop is interrupted when the measured speed of rotation of the rotor falls below a set threshold value.

In one preferred embodiment of the invention, before starting the regulating loop, the initial values of the regulating loop are set to correspond to the reference value of the current to be supplied to the motor.

In a preferred embodiment of the invention the run sequence of the elevator is two-phase or multiphase. In some embodiments the different phases of the run sequence are distinguished from each other on the basis of the state of motion of the elevator car, in which case the run sequence can comprise the following phases: starting to move, evenly increasing acceleration (jerk 1), even acceleration, evenly decreasing acceleration (jerk 2), even speed, evenly increasing deceleration (jerk 3), even deceleration, evenly decreasing deceleration (jerk 4), stopping at the floor. In a preferred embodiment of the invention the reference value of the current in the direction of the q axis is adjusted when shifting from one phase of the speed reference to another.

The control apparatus of an elevator implementing the method according to the description can comprise an electric motor, with which an elevator car is driven in an elevator hoistway in response to elevator calls; a motor bridge, which comprises controllable switches for supplying electric current to the electric motor; a current sensor for measuring the electric current flowing in the electric motor; a mechanical braking device for braking the electric motor; a brake controller for controlling the mechanical braking device; a determiner of the load of the elevator; and also a processor, comprising a signal interface, which is connected to the motor bridge, current sensor, brake controller and also to the determiner of the load of the elevator, and which processor is configured to perform a method according to the description for controlling an electric motor.

The preceding summary, as well as the additional features and additional advantages of the invention presented below, will be better understood by the aid of the following description of some embodiments, said description not limiting the scope of application of the invention.

MORE DETAILED DESCRIPTION OF PREFERRED EMBODIMENTS OF THE INVENTION

Figure 1:
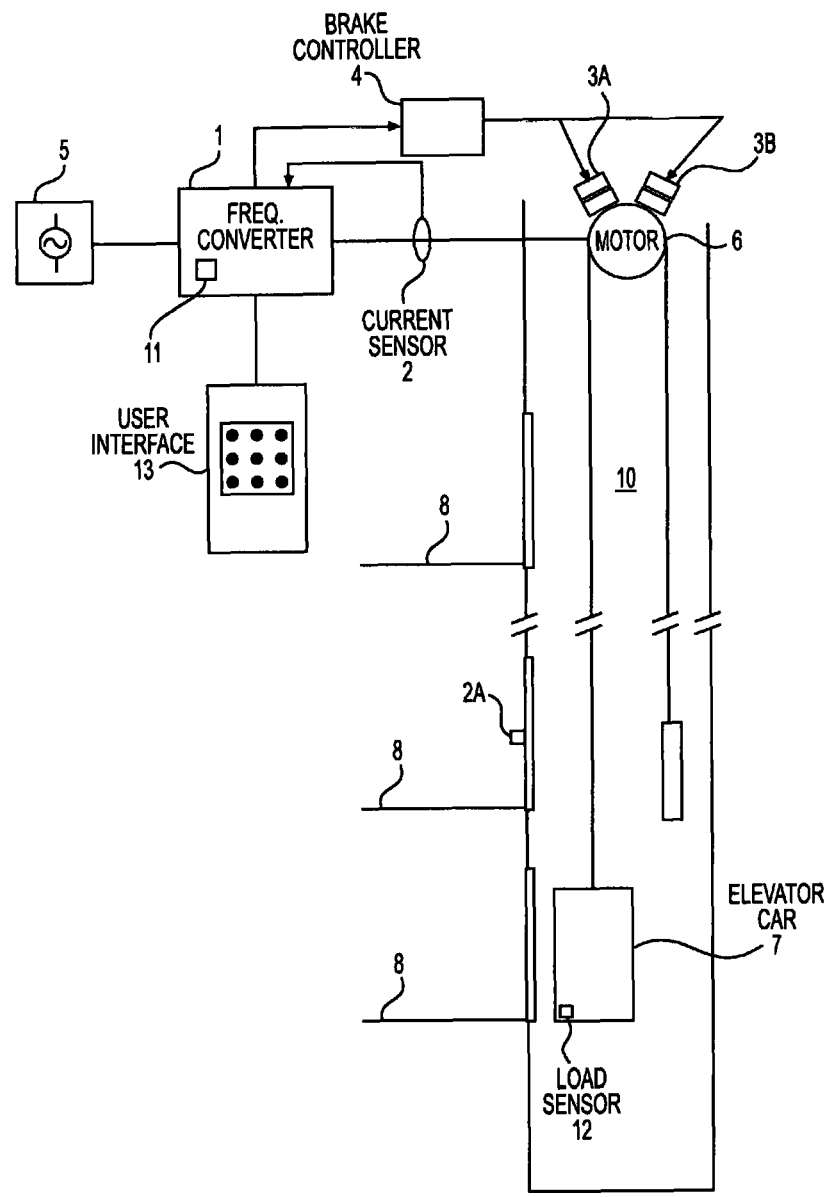
FIG. 1 presents as a block diagram an elevator according to one embodiment.

FIG. 1 presents an elevator, in which the elevator car 7 is driven in the elevator hoistway 10 with an electric motor 6, more precisely with a permanent-magnet synchronous motor. The electric motor 6 can be disposed in a separate machine room, or in the case of an elevator without machine room the electric motor can be disposed in the top part of the elevator hoistway, in the bottom part of the elevator hoistway or beside the trajectory of the elevator car. A traction sheave is fixed to the shaft of the electric motor 6. Traction ropes traveling in the rope grooves of the traction sheave are connected to the elevator car, and the elevator car 7 is driven by pulling traction ropes/the elevator car with a traction sheave. The speed of the elevator car 7 is adjusted with a frequency converter 1. By switching the IGBT transistors of the motor bridge in the frequency converter 1, the current/electric power to be supplied to the electric motor 6 can be steplessly adjusted in the manner desired. The speed of the elevator car is controlled in response to the speed reference calculated by the processor control 11. The speed reference is formed in such a way that the passengers can be softly transferred with the elevator car 7 from one floor 8 to another on the basis of elevator calls given by elevator passengers. The electric motor 6 generally also comprises two mechanical brakes 3A, 3B with which the traction sheave, and thereby the elevator car 7, is braked. The brakes 3A, 3B are controlled by supplying current with the brake controller 4 optionally to the electromagnets of the brakes 3A, 3B.

In conventional solutions there is an encoder on the shaft of the motor, with which encoder the speed of the elevator car and also the load angle are measured, and the measured speed of the elevator car is adjusted with a speed regulator. If the encoder fails or if operation of the encoder is interrupted, e.g. during an electricity outage, the operation of the elevator is also interrupted. Using the elevator during installation has also required installation of an encoder on the motor. The accuracy of the measuring signal of an encoder, on the other hand, affects the ride comfort of the elevator, so that e.g. interference connecting to a measuring cable of the encoder might cause discernible vibration in the elevator car. An encoder also requires space, particularly in the axial direction of the motor, which might be a drawback e.g. in elevators without machine room, in which the greatest possible space-efficiency is required.

The elevator of FIG. 1 is provided with a sensorless control, in which the electric motor 6 can be driven without an encoder or corresponding sensor to be installed on the shaft of the electric motor 6 and measuring the speed of rotation/load angle. At the same time the problems caused by use of an encoder can also be avoided. Sensorless control has been implemented as a processor control 11, which is recorded in the software of the frequency converter 1. In the following the control method is presented in more detail with reference also to FIGS. 2a-2d, which present vector diagrams of the sensorless control during a run with the elevator.

Before the elevator car 7 starts to move, when the mechanical brakes 3A, 3B are engaged to hold the shaft of the electric motor 6/traction sheave stationary in the elevator hoistway, initial angle $\theta_0$ of the electric motor 6 is determined with the signal injection method by the processor 11. The initial angle $\theta_0$ means the information about the position of the excitation axis $\Psi$ of the rotating rotor before the start of the run. The excitation axis $\Psi$ is situated in the center point of the permanent magnets on the rotor. In the signal injection method a voltage vector is supplied with a frequency converter 1 to the stator windings as a function of the electrical angle $\alpha$ of the stator in such a way that the voltage vector rotates at an even angular speed over the pole distribution of the motor 6, in which case the electrical angle $\alpha$ receives values between $0 \ldots 2\pi$. At the same time the stator current is measured with the current sensors 2 and the measured current is sampled with the A/D converter of the processor 11. Determination of the initial angle of an electric motor is based on the saturation of the magnetic circuit of the motor caused by permanent magnets, and the initial angle $\theta_0$ can be determined from the current fluctuation to be detected from current samples. The signal injection method is also presented in international patent application no. WO 2009/130363, the entire contents of which are hereby incorporated by reference.

Figures 2A, 2B:
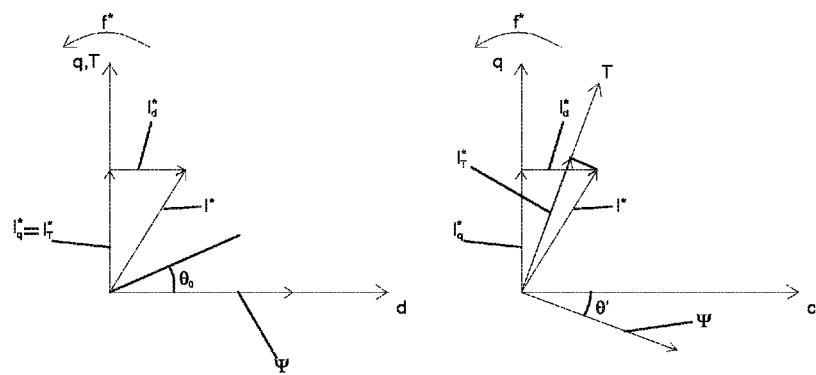
FIGS. 2a, 2b, 2c, 2d present as vector diagrams the control of an electric motor according to one embodiment.
Figures 2C, 2D:
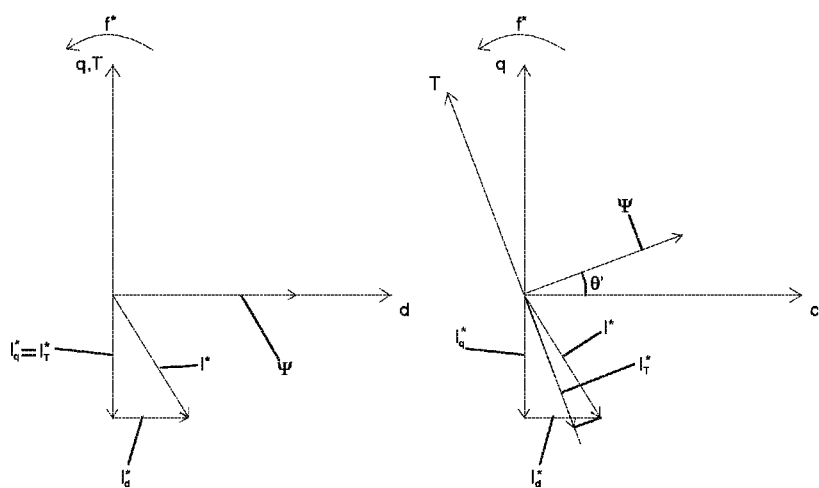

In FIGS. 2a and 2c the orthogonal dq coordinate system used by the processor control 11 is presented by means of the specified initial angle $\theta_0$ in such a way that the d axis is in the direction of the magnetic axis $\Psi$ of the rotor. The three-phase stator currents $I_r$, $I_s$, $I_t$ and the corresponding stator voltages $U_r$, $U_s$, $U_t$ are presented in a dq coordinate system as DC magnitudes $I_d$, $I_q$, $U_d$, $U_q$ as a function of the initial angle $\theta_0$. The dq coordinate system presentation has been made using Clarke's transformation:

$$\begin{bmatrix} I_\alpha \\ I_\beta \end{bmatrix} = \sqrt{\frac{2}{3}} \begin{bmatrix} 1 & -1/2 & -1/2 \\ 0 & \sqrt{3}/2 & -\sqrt{3}/2 \end{bmatrix} \begin{bmatrix} I_r \\ I_s \\ I_t \end{bmatrix}$$

and then Park's transformation:

$$\begin{bmatrix} I_d \\ I_q \end{bmatrix} = \begin{bmatrix} \cos\theta_0 & \sin\theta_0 \\ -\sin\theta_0 & \cos\theta_0 \end{bmatrix} \begin{bmatrix} I_\alpha \\ I_\beta \end{bmatrix}$$

FIGS. 2a and 2c present the position of the dq coordinate system at the start of the run. The direction of the d axis is selected to be the same as the direction of the excitation axis Ψ, in which case the q axis orthogonal to the d axis is in the direction of the torque axis T of the permanent-magnet synchronous motor (the torque axis T is orthogonal to the excitation axis Ψ).

FIGS. 2a and 2b describe the situation in which the elevator drives in the heavy direction, in which case the imbalance of the elevator, i.e. the resultant of the forces in the traction ropes acting on opposite sides of the traction sheave, is in the opposite direction to the movement direction of the elevator car. FIGS. 2c and 2d, on the other hand, describe a run in the light direction, in which case the aforementioned imbalance of the elevator is in the direction of the movement of the elevator car.

In the following description it is assumed that the motor currents to be supplied with the frequency converter 1 correspond during a run with the elevator to the reference values for current that are marked with the symbol "*".

The reference value $I^*_q$ for stator current in the direction of the q axis marked in FIGS. 2a and 2c are determined on the basis of the load of the elevator. In FIGS. 2a and 2c the direction of the torque axis T is the same as the direction of the q axis, so the current $I_q$ produces the drive torque of the motor. The imbalance of the elevator is determined by measuring with a load sensor 12 the load that is loaded into the elevator car. The determination of imbalance also takes into account the weight of the elevator car and of the counterweight, as well as the weight of the elevator ropes and of possible compensating ropes. In addition, the acceleration of the elevator car and the loads to be moved are taken into account in the determination of the current $I_q$. Alternatively, a serviceman could input the value of the load of the elevator car from a manual user interface 13, in which case load sensors 12 are not necessarily needed. The reference value $I^*_q$ of the current is determined in such a way that the torque of the motor produced by the current is sufficient to resist the determined imbalance of the elevator and consequently to drive the elevator car 7. The reference value $I^*_q$ of current is changed during a run with the elevator e.g. when the speed reference v* shifts from the acceleration phase of the elevator car to the phase of even speed, and then to the deceleration phase, in which case the torque requirement changes.

In addition, a current reference is formed for the stator current $I^*_d$ in the direction of the d axis. The magnitude and direction of the reference value $I^*_d$ of the current is selected to resist a change θ' in the load angle caused by a sudden increase in the imbalance of the elevator. A change in the load angle θ' is marked in FIGS. 2b and 2d and it means an angular difference arising when the excitation axis Ψ turns with respect to the dq reference frame.

The reference value $I^*_d$ of the current comprises a fraction $K_1$ (<1) of the reference value $I^*_q$ of the current as well as a separate constant term ($I^*_c$):

$$I^*_d = K_1 I^*_q + I^*_c$$

In one preferred embodiment the parameters of the reference value $I^*_d$ of current receive the values:

$$K_1 = 0.75$$

$$I^*_c = 2 \text{ A}$$

The reference value I* of the stator current is formed as a vector sum of the d and q current references.

$$I^* = \sqrt{I^{*2}_d + I^{*2}_q}$$

The direction of rotation, which is counterclockwise, of the current vector $\overline{I}^*_q$ is marked in FIGS. 2a-2d with an arrow. The direction of rotation of the rotor is the same as the direction of rotation of the current vector $\overline{I}^*_q$, and the rotor rotates at an average frequency, which is the electrical angular frequency f divided by the number of pole pairs of the motor. In this case the speed reference v*, the radius r of the traction sheave and the reference value f* of the electrical angular frequency are linked to each other with the equation:

$$f^* = \frac{v^* P}{2\pi r}.$$

The reference value f* is formed by means of the speed reference v* using the equation above. In this case the traction sheave rotates at the frequency according to the speed reference v* when the current vector $\overline{I}^*_q$ is rotated at the frequency f*. At the same time the elevator car moves evenly from one floor to another with a motion according to the speed reference v*.

The processor 11 starts a run with the elevator by supplying with the frequency converter 1 a current vector $\overline{I}^*$ according to the reference value of current to the electric motor 6 and also by controlling the mechanical brakes 3A, 3B open with the brake control device 4.

FIG. 2b illustrates the effect of stator current $I^*_d$ on run stability. From the situation in FIG. 2a there is a shift to the situation in FIG. 2b, when the imbalance of the elevator driving in the heavy direction, i.e. the force difference on opposite sides of the traction sheave, increases suddenly. This can happen if e.g. there is a stepped increase in friction between the elevator car and the guide rails or a load in the elevator car moves suddenly. In this case the rotor, and simultaneously the magnetic axis Ψ, is able to turn suddenly with respect to the dq coordinate system governed by the processor control 11, because the processor control does not have a direct measuring feedback about the movement of the rotor. In this case the load angle of the motor changes. The change θ' in load angle is marked in FIG. 2b; likewise, the new position of the magnetic axis Ψ is marked in FIG. 2b.

As the magnetic axis Ψ turns, the direction of the torque axis T also changes in the manner presented in FIG. 2b. From FIG. 2b it is seen that when the magnetic axis turns, the component $I^*_T$ of stator current creating torque in the motor, projected onto the torque axis T of the current vector $\overline{I}^*$, increases from the effect of the current $I^*_d$. This means that when the magnetic axis Ψ turns, the drive torque of the motor increases from the effect of the current $I^*_d$. A rapid increase in drive torque stops the turning of the magnetic axis, so that fluctuation and a falling out of the synchronism of the motor caused by a sudden increase in the imbalance of the elevator can be effectively prevented by means of the current $I^*_d$. The run stability of the elevator can also be significantly increased in connection with a sensorless run using the method according to the description.

FIGS. 2c and 2d describe the rotation of the magnetic axis Ψ caused by a sudden increase in the imbalance of the elevator when the elevator is driving in the light direction. In FIG. 2c the direction of the stator current $\overline{I}^*_q$ is in the opposite direction than in FIG. 2a when the driving in the heavy direction. The sudden increase in imbalance when driving in the light direction tries to turn the excitation axis Ψ in a different direction than when driving in the heavy direction, see FIG. 2d. From this it follows that in FIG. 2c the direction of the stator current $\bar{I}^*_d$ is the same as in FIG. 2a, although the direction of the current $\bar{I}^*_q$ has changed. The direction of the stator current $\bar{I}^*_d$ in the direction of the d axis (i.e. the polarity of the reference value $I^*_d$) changes, however, when the drive direction of the elevator car 7 changes. Changing the drive direction means that the direction of rotation of the current vector $\bar{I}^*_q$ changes to clockwise in FIGS. 2a-2d.

In one embodiment the run stability is further increased by measuring, with the motor bridge of the frequency converter 1, the active power of the electric motor from the stator voltages and stator currents. The reference value ($I^*_q$) of the current in the direction of the q axis is adjusted in such a way that a fluctuation in the active power of the electric motor dampens. In this case when the active power momentarily decreases, the reference value ($I^*_q$) of the current and thereby the component of stator current in the direction of the q axis is increased, and when the active power momentarily increases, the reference value ($I^*_q$) of the current/component of stator current in the direction of the q axis is decreased. Damping of the fluctuation of the active power also reduces fluctuation of the load angle θ and thus improves the run stability of the elevator.

In one embodiment a description for the speed of rotation v of the rotor of a permanent-magnet synchronous motor 6 is formed, said description being based on the supply voltages $U_d$, $U_q$, the measured currents $I_d$, $I_q$ and the inductances L of the motor. The speed of rotation is directly proportional to the source voltage E induced in the stator windings by the permanent magnets and roughly follows the equation:

$$E = U_q - RI_q - 2\pi f^* L I_d$$

In this case the speed of rotation of the rotor is measured from the currents and voltages of the motor, using the aforementioned description. When the speed of rotation, and thereby the source voltage, of the rotor increases, the measurement accuracy of the source voltage improves. When the speed of rotation of the rotor exceeds a specified threshold value, measuring of the source voltage is sufficiently accurate to be used in the speed adjustment of the motor. In this case the program of the processor 11 starts a speed regulating loop, in which the speed of rotation of the rotor measured by means of the source voltage is adjusted towards the speed reference v*, in which case the component of the component $I^*_d$ of the stator current stabilizing movement of the rotor is no longer needed and the current consumption of the motor decreases. Correspondingly, the aforementioned regulating loop is interrupted when the measured speed of rotation v of the rotor again falls below the aforementioned threshold value when the elevator car 7 decelerates to a stopping floor.

When changing from one control mode to another, the processor 11 sets the initial values of the regulating loop and also, on the other hand, the reference values I* of current to be supplied to the motor to correspond to each other in such a way that no sudden change occurs in the current/torque of the motor.

The invention is described above by the aid of a few examples of its embodiment. It is obvious to the person skilled in the art that the invention is not limited to the embodiments described above, but that many other applications are possible within the scope of the inventive concept defined by the claims presented below.

It is obvious to the person skilled in the art that the elevator according to the invention can be provided with a counterweight or can be one without a counterweight.

The invention claimed is:

1. A method for controlling an electric motor of an elevator car without information on a speed of rotation of a rotor or an angle of the rotor from an encoder, the method comprising:
    determining an initial angle of a rotor of the electric motor using a signal injection method, when a brake device is applying a braking force to the rotor of the electric motor, the rotor having a magnetic axis;
    determining a dq coordinate system having a d axis and a q axis based on the determined initial angle such that a direction of the d axis is in a same direction as the magnetic axis of the rotor;
    determining a drive direction of the elevator car and a load of the elevator car before the start of a run;
    determining a reference value of current applied to the electric motor in a direction of the q axis such that the reference value of the current in the direction of the q axis is based on the drive direction of the elevator car and is proportional to the load of the elevator car;
    determining a reference value of the current in the direction of the d axis to resist a change in a load angle caused by a sudden increase in imbalance of the elevator car; and
    driving the elevator car by instructing the brake device to reduce the braking force and controlling the current to the electric motor according to the reference value.

2. The method according to claim 1, further comprising:
    selecting a polarity of the reference value of the current in the direction of the d axis based on the drive direction of the elevator car.

3. The method according to claim 1, wherein the reference value of the current in the direction of the d axis includes a vector component of the reference value of the current in the direction of the q axis.

4. The method according to claim 2, wherein the reference value of the current in the direction of the d axis is determined using a constant term.

5. The method according to claim 1, wherein
    the driving the elevator car includes driving the elevator car by rotating the rotor at the speed of rotation such that the speed of rotation of the rotor approaches a speed reference, and
    a frequency of the reference value of the current is based on the speed reference.

6. The method according to claim 5, further comprising:
    determining the speed of rotation of the rotor of the electric motor based on the supply voltage, current and inductance of the electric motor; and
    repeating the determining of the speed of rotation in a regulating loop such that the speed of rotation of the rotor approaches the speed reference when the measured speed of rotation of the rotor exceeds a threshold value.

7. The method according to claim 6, wherein the aforementioned regulating loop is interrupted when the speed of rotation of the rotor falls below a threshold value.

8. The method according to claim 6, wherein before starting the regulating loop, the initial values of the regulating loop are set to correspond to the reference value of the current supplied to the motor.

9. The method according to claim 5, wherein
    the driving of the elevator car is two-phase or multiphase, and
    the determining the reference value of the current in the direction of the q axis includes adjusting the reference value of the current in the direction of the q axis when shifting from one phase of the speed reference to another.

10. The method according to claim 1, further comprising:
measuring power of the electric motor; and
adjusting the reference value of the current in the direction of the q axis to dampen a fluctuation in the active power of the electric motor.

11. An apparatus to control an elevator, the apparatus comprising:
an electric motor configured to drive an elevator car in an elevator hoistway in response to elevator calls, the electric motor having a rotor configured to rotate with a magnetic axis;
a motor bridge including controllable switches configured to supply electric current to the electric motor;
a current sensor configured to measure the electric current supplied to the electric motor;
a mechanical braking device configured to apply a braking force to the rotor of the electric motor;
a brake controller configured to control the mechanical braking device;
a load sensor configured to determine a load of the elevator; and
a processor configured to communicate with the motor bridge, the current sensor, the brake controller and the load sensor of the elevator, the processor is being configured to,
determine an initial angle of the rotor of the electric motor, when the mechanical brake device is applying the braking force to the rotor of the electric motor, the rotor having a magnetic axis,
determine a dq coordinate system having a d axis and a q axis based on the determined initial angle such that a direction of the d axis is in a same direction as the magnetic axis of the rotor,
determine a drive direction of the elevator car and the load of the elevator before the start of a run,
determine a reference value of current applied to the electric motor in a direction of the q axis such that the reference value of the current in the direction of the q axis is based on the drive direction of the elevator car and is proportional to the load of the elevator car,
determine a reference value of the current in the direction of the d axis to resist a change in a load angle caused by a sudden increase in imbalance of the elevator car, and
drive the elevator car by instructing the mechanical brake device to open and control the current to the electric motor according to the reference value.

12. An apparatus to control an elevator, the apparatus comprising:
a motor having a rotor configured to rotate with a magnetic axis to drive the elevator at a speed based on a current applied thereto; and
a processor configured to adjust the current applied to the motor to regulate the speed of the elevator without information on a speed or an angle of the rotor from an encoder or motion sensor by,
modeling the current in a dq coordinate system, the modeling including,
determining a d axis and a q axis of the dq coordinate system such that a direction of the d axis is in a same direction as a magnetic axis of the rotor,
determining a reference value of the current in a direction of the q axis based on a drive direction of the elevator and a load of the elevator,
determining a reference value of the current in the direction of the d axis to resist changes in a load angle,
determining a total reference value of the current based on the reference value of the current in the direction of the q axis and the reference value of the current in the direction of the d axis; and
controlling the current to the motor according to the total reference value.

13. The apparatus according to claim 12, wherein the processor is configured to,
divide a motion of the elevator into various phases and adjust the current applied to the motor when the motion of the elevator transitions between the various phases, and
adjust the reference value of the current in the direction of the d-axis to resist a change in the load angle caused by an imbalance in the load of the elevator the load angle indicating an angular position of the magnetic axis with respect to the dq coordinate system.

14. The apparatus according to claim 12, wherein the processor is configured to,
determine an initial angle of the rotor by sampling the current using a current sensor when the motor is stopped and determining fluctuations in the sampled current,
measure the speed of rotation of the rotor based on a supply voltage, the current applied to the rotor and an inductance of the motor, and
adjust the speed of rotation of the rotor to approach a reference speed, if the measured speed exceeds a threshold.

15. The apparatus of claim 13, wherein the apparatus is configured to adjust the reference value of the current in the direction of the d-axis without measuring the load angle during the run.

* * * * *